United States Patent
Revsin

(10) Patent No.: US 7,650,366 B1
(45) Date of Patent: Jan. 19, 2010

(54) SYSTEM AND METHOD FOR GENERATING A CRASH CONSISTENT PERSISTENT CONSISTENCY POINT IMAGE SET

(75) Inventor: Vitaly Revsin, Andover, MA (US)

(73) Assignee: NetApp, Inc., Sunnyvale, CA (US)

( * ) Notice: Subject to any disclaimer, the term of this patent is extended or adjusted under 35 U.S.C. 154(b) by 312 days.

(21) Appl. No.: 11/223,844

(22) Filed: Sep. 9, 2005

(51) Int. Cl.
*G06F 17/30* (2006.01)

(52) U.S. Cl. .......................... 707/202; 707/204; 714/1; 711/113

(58) Field of Classification Search ........................ None
See application file for complete search history.

(56) References Cited

U.S. PATENT DOCUMENTS

| | | | |
|---|---|---|---|
| 4,156,907 A | 5/1979 | Rawlings et al. | |
| 4,399,503 A | 8/1983 | Hawley | |
| 4,570,217 A | 2/1986 | Allen et al. | |
| 4,598,357 A | 7/1986 | Swenson et al. | |
| 4,688,221 A | 8/1987 | Nakamura et al. | |
| 4,698,808 A | 10/1987 | Ishii | |
| 4,761,785 A | 8/1988 | Clark et al. | |
| 4,805,090 A | 2/1989 | Coogan | |
| 4,837,675 A | 6/1989 | Bean et al. | |
| 4,864,497 A | 9/1989 | Lowry et al. | |
| 4,896,259 A | 1/1990 | Jacobs et al. | |
| 4,899,342 A | 2/1990 | Potter et al. | |
| 4,989,206 A | 1/1991 | Dunphy, Jr. et al. | |
| 5,124,987 A | 6/1992 | Milligan et al. | |
| RE34,100 E | 10/1992 | Hartness | |
| 5,155,835 A | 10/1992 | Belsan | |
| 5,163,131 A | 11/1992 | Row et al. | |
| 5,202,979 A | 4/1993 | Hillis et al. | |
| 5,278,979 A | 1/1994 | Foster et al. | |
| 5,403,639 A * | 4/1995 | Belsan et al. | ............... 707/204 |
| 5,426,747 A | 6/1995 | Weinreb et al. | |
| 5,581,724 A | 12/1996 | Belsan et al. | |
| 5,819,292 A | 10/1998 | Hitz et al. | |
| 5,852,713 A * | 12/1998 | Shannon | ......................... 714/6 |
| 6,374,363 B1 * | 4/2002 | Wu et al. | ........................ 714/6 |
| 6,636,879 B1 | 10/2003 | Doucette et al. | |

(Continued)

FOREIGN PATENT DOCUMENTS

WO    WO 89/10594    11/1989

OTHER PUBLICATIONS

Akyurek, Sedat, *Placing Replicated Data to Reduce Seek Delays*, Department of Computer Science, University of Maryland, UMIACS-TR-91-121, CS-TR-2746, Aug. 1991.

(Continued)

*Primary Examiner*—John R. Cottingham
*Assistant Examiner*—Noosha Arjomandi
(74) *Attorney, Agent, or Firm*—Cesari and McKenna, LLP

(57) ABSTRACT

A technique for generating a crash consistent set of persistent consistency point image set associated with a storage space is provided. A client side agent obtains a first set of read/write statistics before causing storage systems to generate persistent consistency point images of volumes storing logical unit numbers comprising the storage space. Once the persistent consistency point images have been generated, the agent obtains a second set of read/write statistics. The first and second set of statistics are compared to determining if they are equal, thereby signifying that the set of persistent consistency point images is crash consistent.

38 Claims, 8 Drawing Sheets

U.S. PATENT DOCUMENTS

| | | | |
|---|---|---|---|
| 7,069,307 B1 | 6/2006 | Lee et al. | |
| 7,162,662 B1* | 1/2007 | Svarcas et al. | 714/15 |
| 7,225,204 B2* | 5/2007 | Manley et al. | 707/200 |
| 7,240,171 B2* | 7/2007 | Barton et al. | 711/161 |
| 7,334,095 B1* | 2/2008 | Fair et al. | 711/161 |
| 7,356,679 B1* | 4/2008 | Le et al. | 713/1 |
| 7,363,537 B1* | 4/2008 | Svarcas et al. | 714/15 |
| 7,464,238 B1* | 12/2008 | Yadav | 711/162 |
| 7,577,692 B1* | 8/2009 | Corbett et al. | 707/205 |
| 2002/0083316 A1* | 6/2002 | Platenberg et al. | 713/2 |
| 2003/0088579 A1* | 5/2003 | Brown et al. | 707/104.1 |
| 2004/0030668 A1 | 2/2004 | Pawlowski et al. | |
| 2005/0086246 A1* | 4/2005 | Wood et al. | 707/101 |
| 2005/0131853 A1* | 6/2005 | Sampath et al. | 707/1 |
| 2005/0160416 A1* | 7/2005 | Jamison | 717/154 |
| 2005/0216788 A1* | 9/2005 | Mani-Meitav et al. | 714/6 |
| 2005/0240621 A1* | 10/2005 | Robertson et al. | 707/102 |
| 2006/0020924 A1* | 1/2006 | Lo et al. | 717/127 |
| 2006/0259481 A1* | 11/2006 | Handley | 707/5 |
| 2007/0266066 A1* | 11/2007 | Kapoor et al. | 707/205 |
| 2008/0120350 A1* | 5/2008 | Grabowski et al. | 707/202 |
| 2008/0144471 A1* | 6/2008 | Garapati et al. | 369/99 |
| 2008/0275925 A1* | 11/2008 | Kimmel | 707/204 |

OTHER PUBLICATIONS

Bitton, Dina, *Disk Shadowing*, Proceedings of the 14$^{th}$ VLDB Conference, LA, CA 1988.
Chaudhuri, Surajit, et al., *Self-Tuning Technology in Microsoft SQL Server*, Data Engineering Journal 22, Feb. 1999 pp. 20-27.
Chutani, Sailesh, et al., *The Episode File System*, In Proceedings of the USENIX Winter 1992.
Coyne, Robert A., et al., *Storage Systems for National Information Assets*, Proc. Supercomputing 92, Minneapolis, Nov. 1992, pp. 626-633.
Finlayson, Ross S., et al., *Log Files: An Extended File Service Exploiting Write-Once Storage* Department of Computer Science, Stanford University, Report No. STAN-CS-87-1177, Sep. 1987.
Gray, Jim, et al., *The Recovery Manager of the System R Database Manager*, ACM Computing Surveys, (13)2:223-242 1981.
Hecht, Matthew S., et al. *Shadowed Management of Free Disk Pages with a Linked List*, ACM Transactions on Database Systems, 8/4, Dec. 1983, pp. 503-514.
Howard, John, H. et al., *Scale and Performance in a Distributed File System*, Carnegie Mellon University, CMU-ITC-87-068, Aug. 1987.
Howard, John H., *An Overview of the Andrew File System*, Carnegie Mellon University, CMU-ITC-88-062 1988.
Howard, John, H. et al., *Scale and Performance in a Distributed File System*, ACM Trans. Computer System, 6(1), Feb. 1988 pp. 51-81.
Kazar, Michael Leon, *Synchronization and Caching Issues in the Andrew File System*, Carnegie Mellon University, CMU-ITC-88-063.
Kazar, Michael L., et al., *DEcorum File System Architectural Overview*, USENIX Summer Conference, Anaheim, California, 1990.
Kemper, Alfons, et al., *Performance Tuning for SAP R/3*, Data Engineering Journal 22, Feb. 1999 pp. 33-40.
Kent, Jack et al., *Optimizing Shadow Recovery Algorithms*, IEEE Transactions on Software Engineering, 14(2): 155-168, Feb. 1988.
Kistler, et al., *Disconnected Operation in the Coda File System*, ACM Transactions on Computer Systems, vol. 10, No. 1, Feb. 1992, pp. 3-25.
Lorie, Raymond, A. Physical Integrity in a Large Segmented Database, ACM Trans. Database Syst., vol. 2, Mar. 1977, pp. 91-104.
Ousterhout, John et al., *Beating the I/O Bottleneck: A Case for Log-Structured File Systems*, Technical Report, Computer Science Division, Electrical Engineering and Computer Sciences, University of California at Berkeley, Oct. 30, 1988.
Patterson, D., et al., *A Case for Redundant Arrays of Inexpensive Disks (RAID)*, Technical Report, CSD-87-391, Computer Science Division, Electrical Engineering and Computer Sciences, University of California at Berkeley 1987.
Patterson, D., et al., *A Case for Redundant Arrays of Inexpensive Disks (RAID)*, SIGMOD International Conference on Management of Data, Chicago, IL, USA, Jun. 1-3, 1988, SIGMOD Record (17)3:109-16 Sep. 1988.
Peterson, Zachary Nathaniel Joseph, *Data Placement for Copy-on-Write Using Virtual Contiguity*, University of CA, Santa Cruz, Master's Thesis for the Department of Science in Computer Science, Sep. 2002.
Quinlan, Sean, *A Cached WORM File System*, Software-Practice and Experience, 21(12):1289-1299 1991.
Rosenblum, Mendel, et al., *The LFS Storage Manager*, Computer Science Division, Electrical Engineering And Computer Sciences, Univ. of CA, presented at Summer '90 USENIX Technical Conference, Anaheim, CA Jun. 1990.
Rosenblum, Mendel, et al. *The Design and Implementation of a Log-Structured File System* Jul. 24, 1991 pp. 1-15.
Rosenblum, Mendel, *The Design and Implementation of a Log-Structured File System*, 1992 pp. 1-93.
Rosenblum, Mendel, et al., *The Design and Implementation of a Log-Structured File System*, In Proceedings of ACM Transactions on Computer Systems, (10)1:26-52, Feb. 1992.
Schiefer, Berni, et al., *DB2 Universal Database Performance Tuning*, Data-Engineering Journal 22, Feb. 1999 pp. 12-19.
Seltzer, Margo I., et al., *Journaling Versus Soft Updates: Asynchronous Meta-Data Protection in File Systems*, Proceedings of 200 USENIX Annual Technical Conference, Jun. 18-23, 2000.
Shasha, Dennis, *Tuning Time Series Queries in Finance: Case Studies and Recommendations*, Data Engineering Journal 22, Feb. 1999 pp. 41-47.
Sidebotham, Bob, *Volumes: The Andrew File System Data Structuring Primitive*, EEUG Conference Proceedings, Manchester, UK, Autumn 1986.
Subramanian, Muralidhar, et al., *Performance Challenges in Object-Relational DBMSs*, Data Engineering Journal 22, Feb. 1999 pp. 28-32.
Weikum, Gerhard, et al., *Towards Self-Tuning Memory Management for Data Servers*, Data Engineering Journal 22, Feb. 1999 pp. 3-11.
West, Michael, et al. *The ITC Distributed File System: Prototype and Experience*, Carnegie-Mellon University, Technical Report CMU-ITC-040, Mar. 1985.
Zayas, Edward R., AFS-3 Programmer's Reference: Architectural Overview, Transarc Corporation, Pittsburgh, PA, 1.0 edition 1991.
Administration Guide found at http://www.openafs.org/pages/doc/AdminGuide/auagd010.htm, visited on Mar. 2, 2005.
Basilico, et al., *Error Correction System Using "Shadow Memory,"* IBM Technical Disclosure Bulletin, May 1984, pp. 5792-5793.
Bitton, Dina, *Disk Shadowing*, Proceedings of the 14$^{th}$ VLDB Conference, LA, CA (1988).
Blasgen, M.W. et al., *System R:An architectural Overview*,Reprinted from IBM Systems Journal vol. 20, No. 1, 1981 © 1981, 1999.
Borenstein, Nathaniel S., *CMU's Andrew project a retrospective*, Communications of ACM, (39)12, Dec. 1996.
Brown, Mark R. et al., *The Alpine file system*, ACM Transactions on Computing Systems, 3(4):261-293, Nov. 1985.
Chen, Peter M., et al., *An Evaluation of Redundant Arrays of Disks Using an Amdahl 5890* Performance Evaluation, pp. 74-85, 1990.
Chutani, Sailesh, et al., *The Episode file system*, In Proceedings of the USENIX Winter 1992.
Clark, B.E., et al., *Application System /400 Performance Characteristics*, IBM Systems Journal, 28(3): 407-423, 1989.
Data Sheet for the Check Point Software Technologies product Flood-Gate-1 (1997).
Dibble, Peter C., et al., Beyond Striping: The Bridge Multiprocessor File System, Computer Science Department, University of Rochester, Aug. 11, 1989.
Douglis, Fred, et al., *A comparison of two distributed systems: Amoeba and Sprite*—Computing Systems, 4(4), Fall 1991, pp. 353-385 ?{copy of article 1 have has no date or cite}.
Gait, Jason, *Phoenix: A Safe In-Memory File System*. Communications of the ACM, 33(1):81-86, Jan. 1990.
Hartman, John H. et al., *Performance Measurements of a Multiprocessor Sprite Kernel*, Proceedings of the USENIX Conference, 1990.

Hitz, Dave et al., *File System Design for an NFS File Server Appliance*, Technical Report 3002, Rev. C395, presented Jan. 19, 1994.
Howard, John H, et al. *Scale and Performance in a Distributed File System*, Carnegie Mellon University, CMU-ITC-87-068, Aug. 5, 1987.
Howard, John, H. et al., *Scale and performance in a distributed file system*, ACM Trans. Computer. System., 6(1), Feb. 1988 pp. 51-81.
Howard, John H., *An Overview of the Andrew File System*, Carnegie Mellon University, CMU-ITC-88-062.
*The IBM System/38*, Chapter 8, pp. 137-15.
Isomaki, Markus, *Differentiated Service for the Internet*, Department of Technical Physics and Mathematics, May 9, 1998.
Kazar, Michael L., et al., *Decorum File System Architectural Overview*, USENIX Summer Conference, Anaheim, California, 1990.
Lomet, David., et al., *The performance of a multiversion access method*, ACM SIGMOD International Conference on Management of Data, 19:353-363.
Lorie, Raymond, A, *Physical integrity in a large segmented database*, ACM Trans. Database Systems, (2)1: 91-104, Mar. 1977.
Lorie, RA,*Shadow Page Mechanism*, IBM Technical Disclosure Bulletin, Jun. 1986, pp. 340-342.
McKusick, Marshall Kirk, et al., *A Fast File System for UNIX*, Computer Science Division, Department of Electrical Engineering and Computer Sciences, Univ. of CA, Berkley, Feb. 18, 1994.
Miller, Ethan L., et al., *RAMA:A File System for Massively Parallel Computers, 12$^{th}$* IEEE Symposium on Mass Storage Systems, Monterey CA, Apr. 1993, pp. 163-168.
Moons, Herman et al., *Location-Independent Object Invocation in Open Distributed Systems*, Autumn 1991 EurOpen Technical Conference and Exhibition, pp. 287-300 (Sep. 16-20, 1991).
Morris, James H., et al, *Andrew: A Distributed Personal Computing Environment*, Comm. of the ACM, vol. 29, Mar. 1986, pp. 184-201.
Mullender, Sape J., et al., *A distributed file service based on optimistic concurrency control*, ACM Symposium on Operating System Principles (Orcas Island, Washington). Published as Operating Systems Review, 19(5):51-62, Dec. 1985.
Muller, Keith, et al., *A High Performance Multi-Structured File System Design*, In Proceedings of the 13th ACM Symposium on Operating Systems Principles, Oct. 1991, pp. 56-67.
Ousterhout, John K. et al., *The Sprite Network Operating System*, Computer Science Division, Department of Electrical Engineering and Computer Sciences, Univ. of CA, Berkley, Nov. 19, 1987.
Ousterhout, John, *Why Aren't Operating Systems Getting Faster as Fast as Hardware?*, Digital WRL Technical Note TN-11, Oct. 1989.
Ousterhout, John, *A Brief Retrospective On The Sprite Network Operating System*, found at http://www.cs.berkeley.edu/projects/sprite/retrospective.html.visited on Mar. 11, 2005.
Peterson, Zachary Nathaniel Joseph, *Data Placement for Copy-on-Write Using Virtual Contiguity*, University of CA, Santa Cruz, Master of Science in Computer Science Thesis, Sep. 2002.

Redundant Array of Independent Disks, from Wikipedia, the free encyclopedia, found at http://en.wikipedia.org/wiki/RAID, visited on Mar. 9, 2005.
Rosenberg, J., et al., *Stability in a Persistent Store Based on a Large Virtual Memory*, In Security and Persistence, Rosenber, J. & Keedy, J.L. (ed), Springer-Verlag (1990) pp. 229-245.
Rosenblum, Mendel, et al., *The LFS Storage Manager*, Computer Science Division, Electrical Engin. And Computer Sciences, Univ. of CA, presented at Summer '90 USENIX Technical Conference, Anaheim, CA Jun. 1990.
Rosenblum, Mendel, et al., *The Design and Implementation of a Log-Structured File System* Jul. 24, 1991 pp. 1-15.
Rosenblum, Mendel, et al., *The Design and Implementation of a Log-Structured File System*, In Proceedings of ACM Transactions on Computer Systems, (10)1:26-52, Feb. 1992.
Sandberg, Russel et al., *Design and implementation of the Sun Network Filesystem*. In Proc. Summer 1985 USENIX Conf., pp. 119-130, Portland OR (USA), Jun. 1985.
Santry, Douglas S., et al., *Deciding When to Forget in the Elephant File System*, Operating Systems Review, 34(5), (Dec. 1999) pp. 110-123.
Satyanarayanan, M., et al., *The ITC Distributed File System: Principles and Design*, In Proceedings of the 10th ACM Symposium on Operating Systems Principles, (19)5:56-67, Dec. 1985.
Satyanarayanan,.M.. *A survey of distributed file-systems*. Annual Review of Computing Science, 4(73-104), 1989.
Satyanarayanan, M., et al, *Coda: A highly available file system for a distributed workstation environment* Carnegie Mellon University, CMU-ITC.
Satyanarayanan, M., et al, *Coda: A highly available file system for a distributed workstation environment*. IEEE Transactions on Computers, 39(4):447-459, 1990.
Satyanarayanan, Mahadev, *Scalable, Secure, and Highly Available Distributed File Access*, Computer May 1990: 9-21.
Sidebotham, Bob, *Volumes: The Andrew File System Data Structuring Primitive*, EEUG Conference Proceedings, Manchester, UK, Autumn 1986.
User Guide found at http://www.openafs.org/pages/doc/UserGuide/auusg004.htm, visited on Mar. 2, 2005.
Welch, Brent B., et al.,*Pseudo Devices: User-Level Extensions to the Sprite File System*, Computer Science Division, Department of Electrical Engineering and Computer Sciences, Univ. of CA, Berkley, Apr. 1988.
Welch, Brent B., et al., *Pseudo-File-Systems*, Computer Science Division, Department of Electrical Engineering and Computer Sciences, Univ. of CA, Berkley, Oct. 1989.
Wittle, Mark, et al, *LADDIS: The next generation in NFS file server benchmarking*, USENIX Association Conference Proceedings, Apr. 1993.

* cited by examiner

SYSTEM AND METHOD FOR GENERATING A CRASH CONSISTENT PERSISTENT CONSISTENCY POINT IMAGE SET

FIELD OF THE INVENTION

The present invention relates to storage systems and, in particular, to creating a crash consistent persistent consistency point image set of one or more data containers comprising a storage space.

BACKGROUND OF THE INVENTION

A storage system is a computer that provides storage service relating to the organization of information on writable persistent storage devices, such as memories, tapes or disks. The storage system is commonly deployed within a storage area network (SAN) or a network attached storage (NAS) environment. When used within a NAS environment, the storage system may be embodied as a file server including an operating system that implements a file system to logically organize the information as a hierarchical structure of directories and files on, e.g. the disks. Each "on-disk" file may be implemented as a set of data structures, e.g., disk blocks, configured to store information, such as the actual data for the file. A directory, on the other hand, may be implemented as a specially formatted file in which information about other files and directories are stored. As used herein a file is defined to be any logical storage container that contains a fixed or variable amount of data storage space, and that may be allocated storage out of a larger pool of available data storage space. As such, the term file, as used herein and unless the context otherwise dictates, can also mean a container, object or any other storage entity that does not correspond directly to a set of fixed data storage devices. A file system is, generally, a computer system for managing such files, including the allocation of fixed storage space to store files on a temporary basis.

The file server, or storage system, may be further configured to operate according to a client/server model of information delivery to thereby allow many client systems (clients) to access shared resources, such as files, stored on the storage system. Sharing of files is a hallmark of a NAS system, which is enabled because of its semantic level of access to files and file systems. Storage of information on a NAS system is typically deployed over a computer network comprising a geographically distributed collection of interconnected communication links, such as Ethernet, that allow clients to remotely access the information (files) on the storage system. The clients typically communicate with the storage system by exchanging discrete frames or packets of data according to pre-defined protocols, such as the Transmission Control Protocol/Internet Protocol (TCP/IP).

In the client/server model, the client may comprise an application executing on a computer that "connects" to the storage system over a computer network, such as a point-to-point link, shared local area network, wide area network or virtual private network implemented over a public network, such as the Internet. NAS systems generally utilize file-based access protocols; therefore, each client may request the services of the storage system by issuing file system protocol messages (in the form of packets) to the file system over the network identifying one or more files to be accessed without regard to specific locations, e.g., blocks, in which the data are stored on disk. By supporting a plurality of file system protocols, such as the conventional Common Internet File System (CIFS), the Network File System (NFS) and the Direct Access File System (DAFS) protocols, the utility of the storage system may be enhanced for networking clients.

A SAN is a high-speed network that enables establishment of direct connections between a storage system and its storage devices. The SAN may thus be viewed as an extension to a storage bus and, as such, an operating system of the storage system enables access to stored information using block-based access protocols over the "extended bus". In this context, the extended bus is typically embodied as Fibre Channel (FC) or Ethernet media adapted to operate with block access protocols, such as Small Computer Systems Interface (SCSI) protocol encapsulation over FC or TCP/IP/Ethernet.

A SAN arrangement or deployment allows decoupling of storage from the storage system, such as an application server, and some level of information storage sharing at the application server level. There are, however, environments wherein a SAN is dedicated to a single server. In some SAN deployments, the information is organized in the form of databases, while in others a file-based organization is employed. Where the information is organized as files, the client requesting the information maintains file mappings and manages file semantics, while its requests (and server responses) address the information in terms of block addressing on disk using, e.g., a logical unit number (lun).

Certain storage systems may support multi-protocol access and, to that end, enable clients to access data via both block and file-level requests. One example of such a storage system is described in U.S. Patent Publication No. 2004/0030668, entitled MULI-PROTOCOL STORAGE APPLIANCE THAT PROVIDES INTEGRATED SUPPORT FOR FILE AND BLOCK ACCESS PROTOCOLS by Pawlowski et al, published on Feb. 12, 2004.

Some known file systems contain the capability to generate a snapshot of the file system. In the example of a WAFL-based file system, snapshots are described in *TR3002 File System Design for a NFS File Server Appliance* by David Hitz, et al., published by Network Appliance, Inc. and in U.S. Pat. No. 5,819,292 entitled METHOD FOR MAINTAINING CONSISTENT STATES OF A FILE SYSTEM AND FOR CREATING USER-ACCESSIBLE READ-ONLY COPIES OF A FILE SYSTEM, by David Hitz, et al., which are hereby incorporated by reference. "Snapshot" is a trademark of Network Appliance, Inc. It is used for purposes of this patent to designate a persistent consistency point (CP) image. A persistent consistency point image (PCPI) is a point-in-time representation of a data container stored on one or more storage devices (e.g., on disk) or in other persistent memory and having a name or other identifier that distinguishes it from other PCPIs taken at other points in time. A PCPI can also include other information (metadata) about the data container at the particular point in time for which the image is taken. The terms "PCPI" and "snapshot" shall be used interchangeably throughout this patent without derogation of Network Appliance's trademark rights.

One common use for a storage system that supports block-based protocols is to export one or more data containers, such as logical unit numbers (luns), for use by a volume manager executing on a client. The volume manager typically forms the data containers into one or more volume (or disk) groups. A volume group is a set of luns aggregated (by the volume manager) to provide a storage space that may be utilized by the client to overlay one or more file systems or other structured storage thereon. As used herein, the term storage space means storage managed by a volume manager that utilizes one or more data containers hosted by one or more storage systems. One example of a storage space is a file system overlaid onto a volume group that comprises one or more luns stored within either a plurality of volumes of a single storage system or within a plurality of volume or a plurality of storage systems. Another example of a storage space is a volume group managed by a volume manager to enable an application, such as a data-base application, to store structured data thereon.

By utilizing a storage system to host the luns providing a storage space, the underlying data availability and protection features of the storage system's file system may be utilized with the storage space. One such feature is the ability to generate a PCPI of a volume storing the luns associated with the volume group. If all luns reside on a single volume of a single storage system, a PCPI may be generated using conventional techniques. In such a case, the PCPI of that volume generates a true point in time image of the storage space. However, if the luns are spread among either multiple volumes on a single storage system or multiple volumes on a plurality of storage systems, it is possible for a set of PCPIs of the luns providing the storage space to be generated that is not a point in time image of the data. For example, assume write data of two write operations (N and N+1), where operation N+1 is dependent on operation N, are stored on lun providing the storage space. It is possible that write data of operation N will be stored on a first data container on a storage system and write data of operation N+1 stored on another data container and another storage system. Depending on the sequence of write operations performed by each storage system, it is further possible that write data of operation N+1 is stored within the set of PCPIs, while write data of operation N is not. This will result in a storage space that, when restored from the PCPI set, is not consistent and which may prevent the volume manager from being able to recover the true state of the storage space. A PCPI set that avoids this failure, i.e., a PCPI set that only contains write data of operation N+1 if write data of operation N is included, is termed a "crash consistent" PCPI set. Similarly, a PCPI set wherein data of operation N+1 is stored within the PCPI set and is data of operation N is not is termed a "crash inconsistent" PCPI set.

One technique to enable the creation of crash consistent PCPI sets is to halt (freeze) is input/output (I/O) operations at a predetermined level of the client's protocol stack, e.g., at the application level, file system level, and/or volume manager level. If the client protocol stack supports such a freeze I/O operation, a crash consistent PCPI set may be generated by first freezing I/O operations directed to the storage space. After waiting for any final operations to be performed, PCPIs may then be generated of all of the appropriate volumes. Once the PCPI set has been generated, the frozen protocol stack level I/O operates at a predetermined level are "thawed" (re-sumed) for processing to the storage space.

However, a noted disadvantage is that many known file systems do not include support for such functionality. For example, the commonly available Linux operating system does not support a freeze I/O functionality operation. As such, the creation of crash consistent PCPI sets when utilizing such a file system is not available. This reduces ability to utilize the data management techniques available on a storage system.

SUMMARY OF THE INVENTION

The present invention overcomes the disadvantages of the prior art by providing a technique for generating a crash consistent persistent consistency point image (PCPI) set of a storage space managed by one or more storage systems. One or more data containers, such as logical unit numbers (luns), stored within a plurality of volumes managed by the storage systems are organized into one or more volume (or disk) groups, which are then subsequently organized into a client volume by a client volume manager. The storage space is then defined on the volume(s) by, for example, overlaying a client file system onto the client volume or enabling an application to directly manage data stored within the volume(s).

A client side agent is provided that executes on each client configured to generate a crash consistent PCPI set of the storage space. When an administrator initiates a PCPI create operation on the storage space, the agent first accesses each storage system and obtains information regarding the data containers residing on the storage space. This information may include, e.g., a name of each storage system, a name of each data container, etc. Once the appropriate file information has been obtained, the agent retrieves a first set of read/write (R/W) statistics for each data container that is part of the storage space. The agent then causes each storage system to generate a PCPI of each volume storing a data container. Once the PCPI has been generated, the agent retrieves a second set of R/W statistics. The agent compares the first set of R/W statistics with the second set of R/W statistics and a resulting method (equal) indicates that no modifying operations were performed to the data container while the PCPIs were being generated. As such, the PCPI set is considered crash consistent.

However, if the comparison results on the two sets of statistics not matching (not equal), the PCPI set is considered crash inconsistent. In response, the agent deletes the newly generated PCPIs and essentially restarts the PCPI create operation by, inter alia, retrieving a new first set of R/W statistics, generating a PCPI of each volume retrieving a second set of R/W statistics, etc. Notably, the agent may attempt to obtain a crash consistent PCPI set for only a predetermined number of times. If the agent is unable to generate such a PCPI set within the predetermined time, an error message is generated and displayed to alert the administrator that appropriate action is required, e.g., the number of I/O operations directed to the storage space is reduced to thereby enable generation a crash consistent PCPI set.

BRIEF DESCRIPTION OF THE DRAWINGS

The above and further advantages of invention may be better understood by referring to the following description in conjunction with the accompanying drawings in which like reference numerals indicate identical or functionally similar elements.

DETAILED DESCRIPTION OF AN ILLUSTRATIVE EMBODIMENT

A. Network Environment

Figure 1:
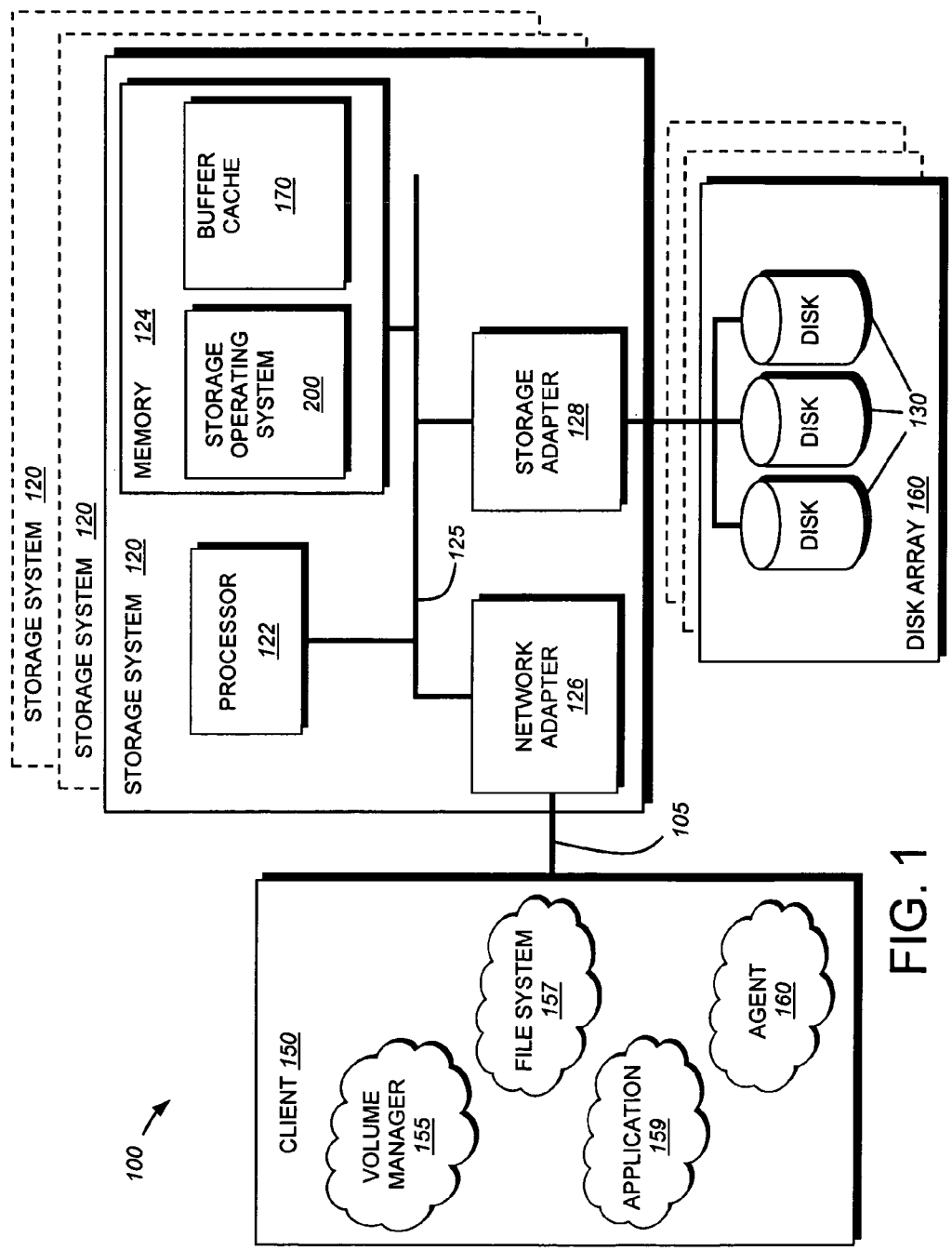
FIG. 1 is a schematic block diagram of an exemplary network environment in accordance with an embodiment of the present invention.

FIG. 1 is a schematic block diagram of an environment 100 including a storage system 120 that may be advantageously used with the present invention. The storage system is illustratively a computer that provides storage service relating to the organization of information on storage devices, such as disks 130 of a disk array 160. The storage system 120 comprises a processor 122, a memory 124, a network adapter 126 and a storage adapter 128 interconnected by a system bus 125. The storage system 120 also includes a storage operating system 200 that preferably implements a high-level module, such as a file system, to logically organize the information as a hierarchical structure of directories, files and special types of files called virtual disks (hereinafter "blocks") on the disks.

In the illustrative embodiment, the memory 124 comprises storage locations that are addressable by the processor and adapters for storing software program code. A portion of the memory may be further organized as a "buffer cache" 170 for storing certain data structures associated with the present invention. The processor and adapters may, in turn, comprise processing elements and/or logic circuitry configured to execute the software code and manipulate the data structures. Storage operating system 200, portions of which are typically resident in memory and executed by the processing elements, functionally organizes the system 120 by, inter alia, invoking storage operations executed by the storage system. It will be apparent to those skilled in the art that other processing and memory means, including various computer readable media, may be used for storing and executing program instructions pertaining to the inventive technique described herein.

The network adapter 126 comprises the mechanical, electrical and signaling circuitry needed to connect the storage system 120 to a client 150 over a computer network 105, which may comprise a point-to-point connection or a shared medium, such as a local area network (LAN) or wide area network (WAN). Illustratively, the computer network 105 may be embodied as an Ethernet network or a Fibre Channel (FC) network. The client 150 may communicate with the storage system over network 105 by exchanging discrete frames or packets of data according to pre-defined protocols, such as the Transmission Control Protocol/Internet Protocol (TCP/IP) or SCSI encapsulated in FC (FCP).

The client 150 may be a general-purpose computer configured to execute a volume manager 155. An example of a volume manager 155 that may be advantageously used with the present invention is the Veritas® Volume Manager available from Veritas, Inc. of Mountain View, Calif. It should be noted that the use of the Veritas Volume Manager is exemplary only and that any volume manager may be utilized with the teachings of the present invention. The volume manager 155 organizes data containers exported by the storage system 120 into a storage space for use by, for example, a client file system 157 and/or applications 159. In an illustrative embodiment of the present invention, the client executes volume manager 155, which organizes one or more luns exported by storage system 120 into one or more volume (or disk) groups and further organizes the volume groups into a client logical volume. The file system module 157 then overlays a client file system onto the client logical volume. Application 159 may then store data within the client file system. In an alternate embodiment, application 159, such as a database, may manage structured data directly on the client logical volume without using an overlaid file system.

Moreover, the client 150 may interact with the storage system 120 in accordance with a client/server model of information delivery. That is, the client may request the services of the storage system, and the system may return the results of the services requested by the client, by exchanging packets over the network 105. The clients may issue packets including file-based access protocols, such as the Common Internet File System (CIFS) protocol or Network File System (NFS) protocol, over TCP/IP when accessing information in the form of files and directories. Alternatively, the client may issue packets including block-based access protocols, such as the Small Computer Systems Interface (SCSI) protocol encapsulated over TCP (iSCSI) and SCSI encapsulated over Fibre Channel (FCP), when accessing information in the form of blocks. Also included in client 150 is a novel client agent 160 that generates crash consistent PCPI sets, as described further below.

The storage adapter 128 cooperates with the storage operating system 200 executing on the system 120 to access information requested by a user (or client). The information may be stored on any type of attached array of writable storage device media such as video tape, optical, DVD, magnetic tape, bubble memory, electronic random access memory, micro-electro mechanical and any other similar media adapted to store information, including data and parity information. However, as illustratively described herein, the information is preferably stored on the disks 130, such as HDD and/or DASD, of array 160. The storage adapter includes input/output (I/O) interface circuitry that couples to the disks over an I/0 interconnect arrangement, such as a conventional high-performance, FC serial link topology.

Storage of information on array 160 is preferably implemented as one or more storage "volumes" that comprise a collection of physical storage disks 130 cooperating to define an overall logical arrangement of volume block number (vbn) space on the volume(s). Each logical volume is generally, although not necessarily, associated with its own file system. The disks within a logical volume/file system are typically organized as one or more groups, wherein each group may be operated as a Redundant Array of Independent (or Inexpensive) Disks (RAID). Most RAID implementations enhance the reliability/integrity of data storage through the redundant writing of data "stripes" across a given number of physical disks in the RAID group, and the appropriate storing of parity information with respect to the striped data. An illustrative example of a RAID implementation is a RAID-4 level implementation, although it should be understood that other types and levels of RAID implementations may be used in accordance with the inventive principles described herein.

In the illustrative embodiment, a plurality of logical unit numbers (luns), which is stored in a plurality of volumes and provide a storage space managed by a single storage system 120. However, in an alternate embodiment, the luns may be managed by a plurality of storage systems 120 and stored within a plurality of disk arrays 160. As such, the description of a single storage system above should be taken as exemplary only.

B. Storage Operating System

To facilitate access to the disks 130, the storage operating system 200 implements a write-anywhere file system that cooperates with virtualization modules to "virtualize" the storage space provided by disks 130. The file system logically organizes the information as a hierarchical structure of named directories and files on the disks. Each "on-disk" file may be implemented as set of disk blocks configure to store information, such as data, whereas the directory may be implemented as a specially formatted file in which names and links to other files and directories are stored. The virtualization modules allow the file system to further logically organize information as a hierarchical structure of blocks on the disks that are exported as named luns.

In the illustrative embodiment, the storage operating system is preferably the NetApp® Data ONTAP™ operating system available from Network Appliance, Inc., Sunnyvale, Calif. that implements a Write Anywhere File Layout (WAFL™) file system. However, it is expressly contemplated that any appropriate storage operating system may be enhanced for use in accordance with the inventive principles described herein. As such, where the term "WAFL" is employed, it should be taken broadly to refer to any file system that is otherwise adaptable to the teachings of this invention.

Figure 2:
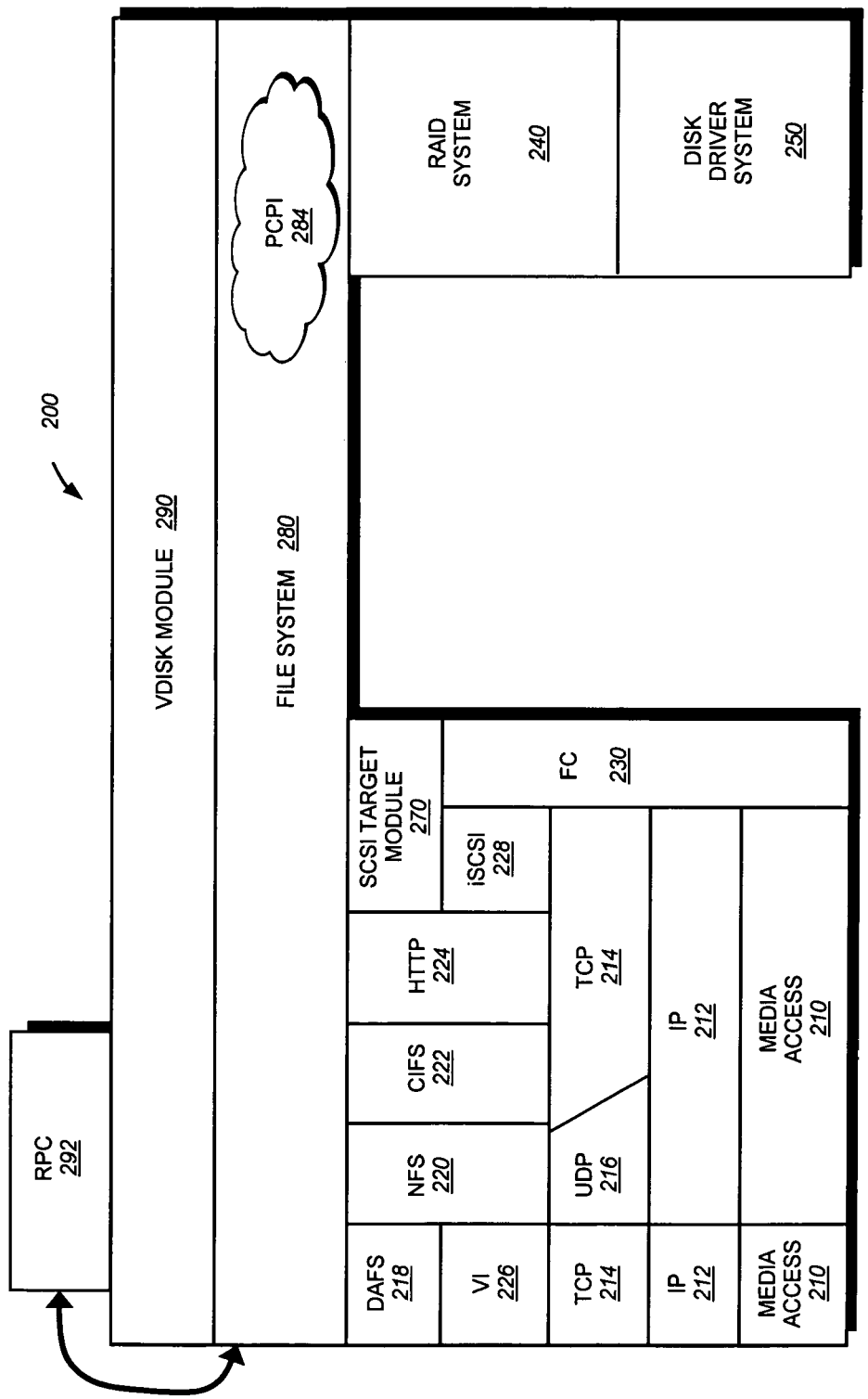
FIG. 2 is a schematic block diagram of an exemplary storage operating system in accordance with an embodiment of the present invention.

FIG. 2 is a schematic block diagram of the storage operating system 200 that may be advantageously used with the present invention. The storage operating system comprises a series of software layers organized to form an integrated network protocol stack or, more generally, a multi-protocol engine that provides data paths for clients to access information stored on the storage system using block and file access protocols. The protocol stack includes a media access layer 210 of network drivers (e.g., gigabit Ethernet drivers) that interfaces to network protocol layers, such as the IP layer 212 and its supporting transport mechanisms, the TCP layer 214 and the User Datagram Protocol (UDP) layer 216. A file system protocol layer provides multi-protocol file access and, to that end, includes support for the Direct Access File System (DAFS) protocol 218, the NFS protocol 220, the CIFS protocol 222 and the Hypertext Transfer Protocol (HTTP) protocol 224. A VI layer 226 implements the VI architecture to provide direct access transport (DAT) capabilities, such as RDMA, as required by the DAFS protocol 218.

An iSCSI driver layer 228 provides block protocol access over the TCP/IP network protocol layers, while a FC driver layer 230 receives and transmits block access requests and responses to and from the storage system. The FC and iSCSI drivers provide FC-specific and iSCSI-specific access control to the blocks and, thus, manage exports of luns to either iSCSI or FCP or, alternatively, to both iSCSI and FCP when accessing the blocks on the storage system. In addition, the storage operating system includes a storage module embodied as a RAID system 240 that manages the storage and retrieval of information to and from the volumes/disks in accordance with I/O operations, and a disk driver system 250 that implements a disk access protocol such as, e.g., the SCSI protocol.

Bridging the disk software layers with the integrated network protocol stack layers is a virtualization system that is implemented by a file system 280 interacting with virtualization modules illustratively embodied as, e.g., vdisk module 290 and SCSI target module 270. The vdisk module 290 is layered on the file system 280 to enable access by administrative interfaces, in response to a user (system administrator) issuing commands to the storage system. The SCSI target module 270 is disposed between the FC and iSCSI drivers 228, 230 and the file system 280 to provide a translation layer of the virtualization system between the block (lun) space and the file system space, where luns are represented as blocks.

The file system is illustratively a message-based system that provides logical volume management capabilities for use in access to the information stored on the storage devices, such as disks. That is, in addition to providing file system semantics, the file system 280 provides functions normally associated with a volume manager. These functions include (i) aggregation of the disks, (ii) aggregation of storage bandwidth of the disks, and (iii) reliability guarantees, such as mirroring and/or parity (RAID). The file system 280 illustratively implements the WAFL file system (hereinafter generally the "write-anywhere file system") having an on-disk format representation that is block-based using, e.g., 4 kilobyte (KB) blocks and using index nodes ("inodes") to identify files and file attributes (such as creation time, access permissions, size and block location). The file system uses files to store metadata describing the layout of its file system; these metadata files include, among others, an inode file. A file handle, i.e., an identifier that includes an inode number, is used to retrieve an inode from disk.

Also associated with file system 280 is a set of persistent consistency point image (PCPI) processes 284. The PCPI processes 284 enable the file system 280 to generate PCPIs of data containers, such as volumes. In alternate embodiments, the functionality of the PCPI processes 284 may be integrated into the file system 280. Broadly stated, all inodes of the write-anywhere file system are organized into the inode file. A file system (fs) info block specifies the layout of information in the file system and includes an inode of a file that includes all other inodes of the file system. Each logical volume (file system) has an fsinfo block that is preferably stored at a fixed location within, e.g., a RAID group. The inode of the root fsinfo block may directly reference (point to) blocks of the inode file or may reference indirect blocks of the inode file that, in turn, reference direct blocks of the inode file. Within each direct block of the inode file are embedded inodes, each of which may reference indirect blocks that, in turn, reference data blocks of a file.

A set of remote procedure calls (RPCs) 292 is provided that enables clients of the storage system to invoke various file system functions. For example, the client agent 160 executing on client 150 may send a RPC to the RPC module 292 of the storage system 120 to invoke the creation of a PCPI using, e.g., the PCPI function 284 of the file system 280. Additionally, in the illustrative embodiment, the client agent 160 may utilize a RPC to obtain read/write (R/W) statistics of a lun managed by the storage system.

Operationally, a request from the client 150 is forwarded as a packet over the computer network 105 and onto the storage system 120 where it is received at the network adapter 126. A network driver (of layer 210 or layer 230) processes the packet and, if appropriate, passes it on to a network protocol and file access layer for additional processing prior to forwarding to the write-anywhere file system 280. Here, the file system generates operations to load (retrieve) the requested data from disk 130 if it is not resident "in core", i.e., in the buffer cache 170. If the information is not in the cache, the file system 280 indexes into the inode file using the inode number to access an appropriate entry and retrieve a logical vbn. The file system then passes a message structure including the logical vbn to the RAID system 240; the logical vbn is mapped to a disk identifier and disk block number (disk,dbn) and sent to an appropriate driver (e.g., SCSI) of the disk driver system 250. The disk driver accesses the dbn from the specified disk 130 and loads the requested data block(s) in buffer cache 170 for processing by the storage system. Upon completion of the request, the storage system (and operating system) returns a reply to the client 150 over the network 105.

It should be noted that the software "path" through the storage operating system layers described above needed to perform data storage access for the client request received at the storage system may alternatively be implemented in hardware. That is, in an alternate embodiment of the invention, a storage access request data path may be implemented as logic circuitry embodied within a field programmable gate array (FPGA) or an application specific integrated circuit (ASIC). This type of hardware implementation increases the performance of the storage service provided by storage system 120 in response to a request issued by client 150. Moreover, in another alternate embodiment of the invention, the processing elements of adapters 126, 128 may be configure to offload some or all of the packet processing and storage access operations, respectively, from processor 122, to thereby increase the performance of the storage service provided by the system. It is expressly contemplated that the various processes, architectures and procedures described herein can be implemented in hardware, firmware or software.

As used herein, the term "storage operating system" generally refers to the computer-executable code operable to perform a storage function in a storage system, e.g., that manages data access and may, in the case of a file server, implement file system semantics. In this sense, the ONTAP software is an example of such a storage operating system implemented as a microkernel and including the file system 280 to implement the WAFL file system semantics and manage data access. The storage operating system can also be implemented as an application program operating over a general-purpose operating system, such as UNIX® or Windows XP®, or as a general-purpose operating system with configurable functionality, which is configured for storage applications as described herein.

In addition, it will be understood to those skilled in the art that the inventive technique described herein may apply to any type of special-purpose (e.g., file server, filer or multi-protocol storage appliance) or general-purpose computer, including a standalone computer or portion thereof, embodied as or including a storage system 120. An example of a multi-protocol storage appliance that may be advantageously used with the present invention is described in the above-referenced U.S. Patent Publication No. 2004/0030668 titled MULTI-PROTOCOL STORAGE APPLIANCE THAT PROVIDES INTEGRATED SUPPORT FOR FILE AND BLOCK ACCESS PROTOCOLS, filed on Aug. 8, 2002. Moreover, the teachings of this invention can be adapted to a variety of storage system architectures including, but not limited to, a network-attached storage environment, a storage area network and disk assembly directly-attached to a client or host computer. The term "storage system" should therefore be taken broadly to include such arrangements in addition to any subsystems configure to perform a storage function and associated with other equipment or systems.

C. File System Organization

Figure 3:
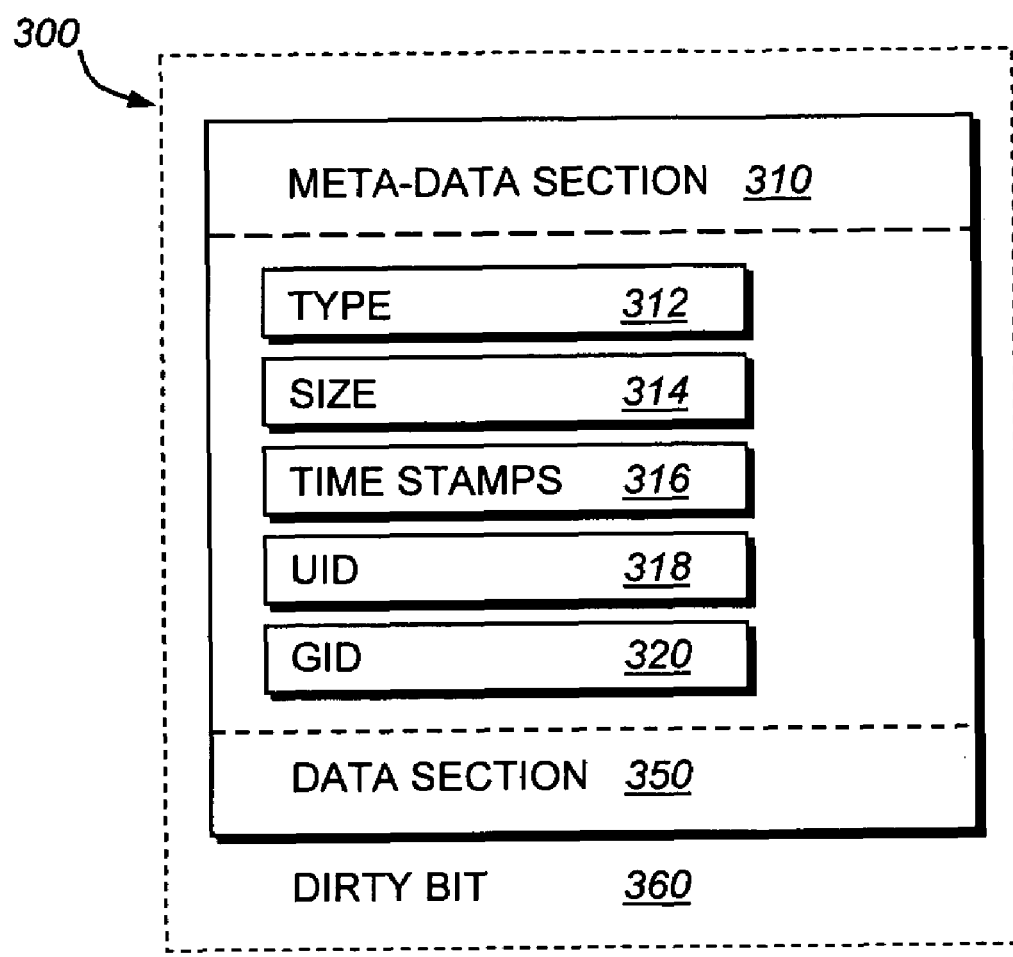
FIG. 3 is a schematic block diagram of an exemplary inode data structure in accordance with an embodiment of the present invention.

In the illustrative embodiment, a file is represented in the write-anywhere file system as an inode data structure adapted for storage on the disks 130. FIG. 3 is a schematic block diagram of an inode 300, which preferably includes a metadata section 310 and a data section 350. The information stored in the metadata section 310 of each inode 300 describes the file and, as such, includes the type (e.g., regular, directory, virtual disk) 312 of file, the size 314 of the file, time stamps (e.g., access and/or modification) 316 for the file and ownership, i.e., user identifier (UID 318) and group ID (GID 320), of the file. The contents of the data section 350 of each inode, however, may be interpreted differently depending upon the type of file (inode) defined within the type field 312. For example, the data section 350 of a directory inode contains metadata controlled by the file system, whereas the data section of a regular inode contains file system data. In this latter case, the data section 350 includes a representation of the data associated with the file.

Specifically, the data section 350 of a regular on-disk inode may include file system data or pointers, the latter referencing 4 KB data blocks on disk used to store the file system data. Each pointer is preferably a logical vbn to facilitate efficiency among the file system and the RAID system 240 when accessing the data on disks. Given the restricted size (e.g., 128 bytes) of the inode, file system data having a size that is less than or equal to 64 bytes is represented, in its entirety, within the data section of that inode. However, if the file system data is greater than 64 bytes but less than or equal to 64 KB, then the data section of the inode (e.g., a first level inode) comprises up to 16 pointers, each of which references a 4 KB block of data on the disk.

Moreover, if the size of the data is greater than 64 KB but less than or equal to 64 megabytes (MB), then each pointer in the data section 350 of the inode (e.g., a second level inode) references an indirect block (e.g., a first level block) that contains 1024 pointers, each of which references a 4 KB data block on disk. For file system data having a size greater than 64MB, each pointer in the data section 350 of the inode (e.g., a third level inode) references a double-indirect block (e.g., a second level block) that contains 1024 pointers, each referencing an indirect (e.g., a first level) block. The indirect block, in turn, that contains 1024 pointers, each of which references a 4 KB data block on disk. When accessing a file, each block of the file may be loaded from disk 130 into the buffer cache 170.

When an on-disk inode (or block) is loaded from disk 130 into buffer cache 170, its corresponding in core structure embeds the on-disk structure. For example, the dotted line surrounding the inode 300 (FIG. 3) indicates the in core representation of the on-disk inode structure. The in core structure is a block of memory that stores the on-disk structure plus additional information needed to manage data in the memory (but not on disk). The additional information may include, e.g., a "dirty" bit 360. After data in the inode (or block) is updated/modified as instructed by, e.g., a write operation, the modified data is marked "dirty" using the dirty bit 360 so that the inode (block) can be subsequently "flushed" (stored) to disk. The in core and on-disk format structures of the WAFL file system, including the inodes and inode file, are disclosed and described in the previously incorporated U.S. Pat. No. 5,819,292 titled METHOD FOR MAINTAINING CONSISTENT STATES OF A FILE SYSTEM AND FOR CREATING USER-ACCESSIBLE READ-ONLY COPIES OF A FILE SYSTEM by David Hitz et al., issued on Oct. 6, 1998.

Figure 4:
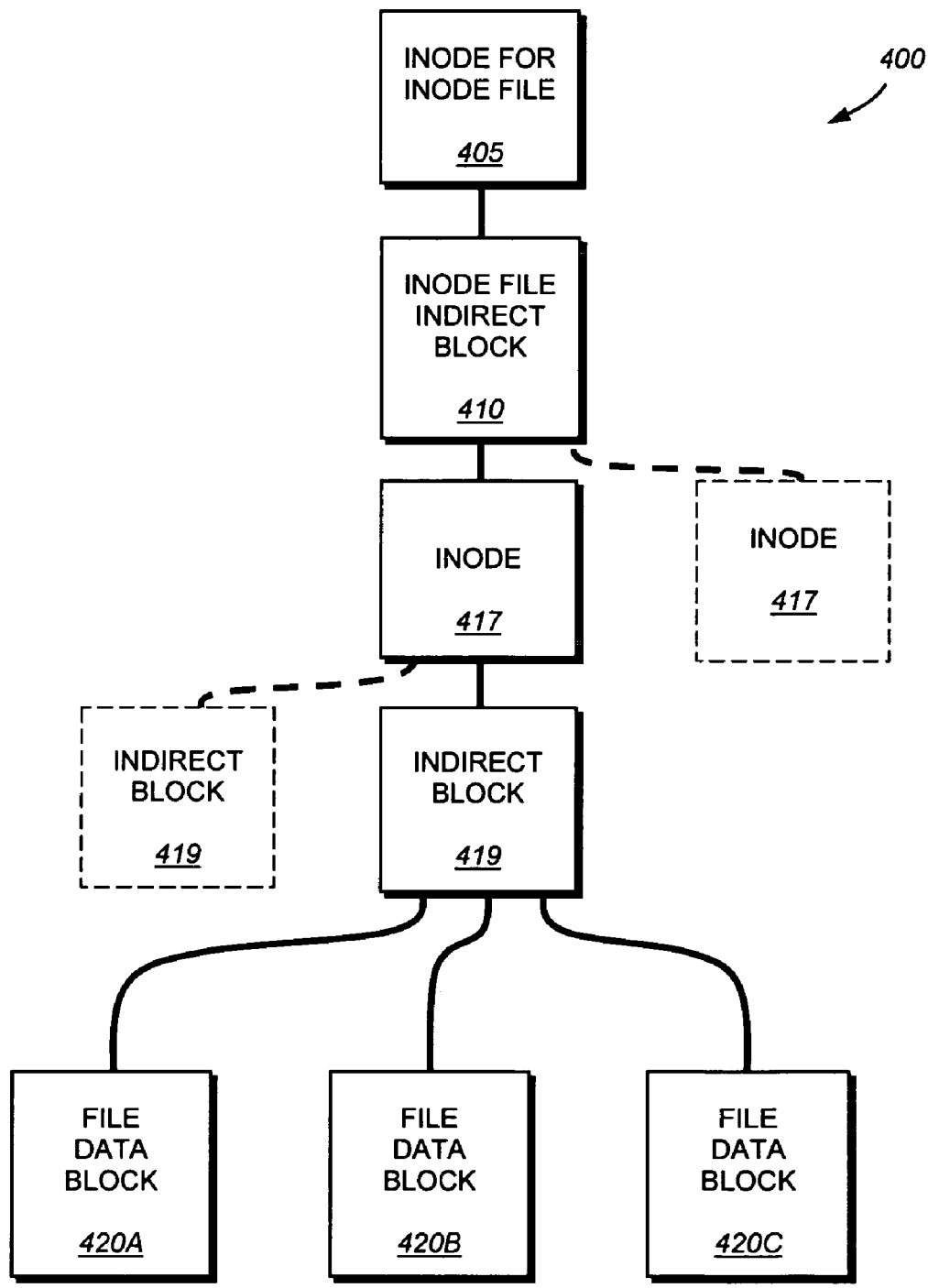
FIG. 4 is a schematic block diagram of an exemplary inode data structure in accordance with an embodiment of the present invention.

A PCPI is a restorable version of a file system created at a predetermined point in time and stored on the same storage devices that store the file system. PCPIs are generally created on some regular user-defined schedule. The PCPI is stored on-disk along with the active file system, and is loaded into buffer cache 170 of the storage system memory 124 as requested by the storage operating system 200. An exemplary file system inode structure 400 is shown in FIG. 4. The inode for an inode file 405 contains information describing the inode file associated with a given file system. In this exemplary file system inode structure the inode for the inode file 405 contains a pointer to an inode file indirect block 410. The inode file indirect block 410 contains a set of pointers to inode blocks, each typically containing multiple inodes 417, which in turn contain pointers to indirect blocks 419. The indirect blocks 419 include pointers to file data blocks 420A, 420B and 420C. Each of the file data blocks 420(A-C) is capable of storing, in the illustrative embodiment, 4 KB of data.

Figure 5:
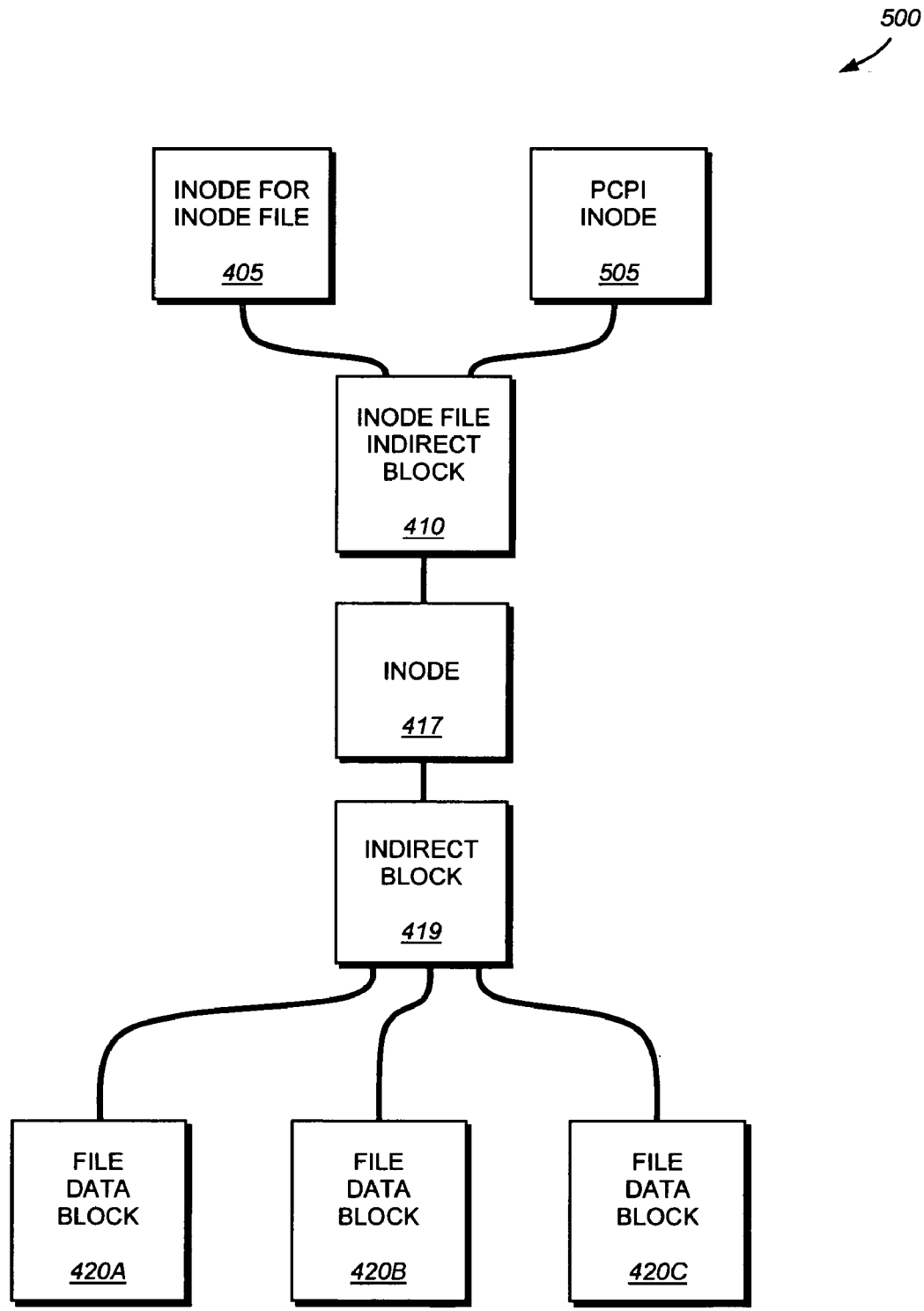
FIG. 5 is a schematic block diagram of an exemplary inode data structure showing a persistent consistency point image root inode in accordance with an embodiment of the present invention.

When the file system generates a PCPI of a given file system, a PCPI inode is generated as shown in FIG. 5. The PCPI inode 505 is, in essence, a duplicate copy of the inode for the inode file 405 of the file system 400. Thus, the exemplary file system structure 400 includes the inode file indirect blocks 410, inodes 417, indirect blocks 419 and file data blocks 420A-C as in FIG. 4. When a user modifies a file data block, the file system layer writes the new data block to disk and changes the active file system to point to the newly created block.

Figure 6:
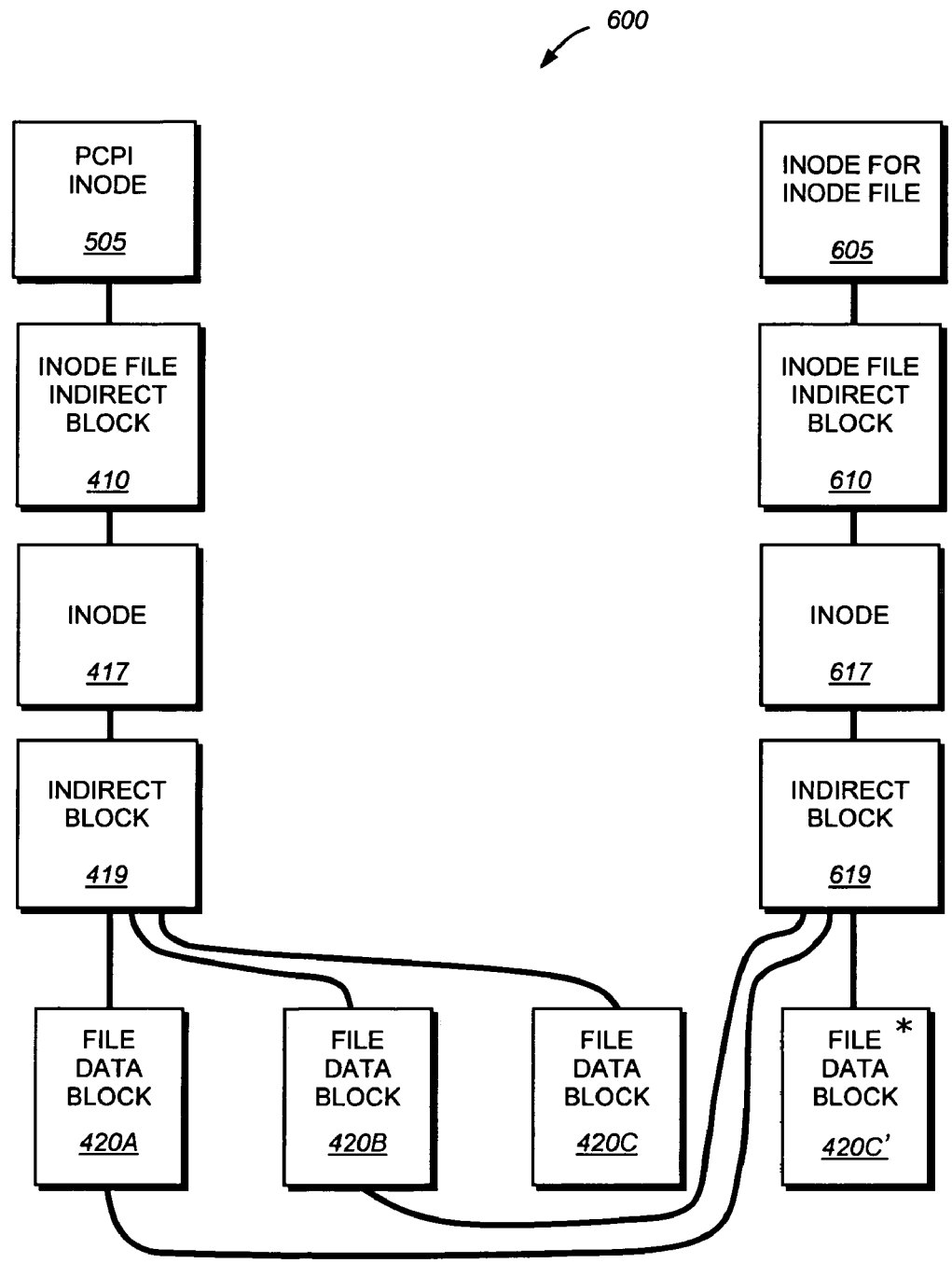
FIG. 6 is a schematic block diagram of an exemplary inode data structure showing a modified data container in accordance with an embodiment of the present invention.

FIG. 6 shows an exemplary inode file system structure 600 after a file data block has been modified. In this illustrative example, file data block 420C was modified to file data block 420C' and the contents of the modified file data block are written to a new location on disk as a function of the exemplary WAFL file system. Because of this new location, the indirect block 619 must be rewritten. Due to this changed indirect block 619, the inode 617 must be rewritten. Similarly, the inode file indirect block 610 and the inode for the inode file 605 must be rewritten. Thus, after a file data block has been modified the PCPI inode 505 contains a pointer to the original inode file indirect block 410 which in turn contains pointers through the inode 417 and an indirect block 419 to the original file data blocks 420A, 420B and 420C. In addition, the newly written indirect block 619 includes pointers to unmodified file data blocks 420A and 420B. However, the indirect block 619 also contains a pointer to the modified file data block 420C' representing the new arrangement of the active file system. A new inode for the inode file 605 is established representing the new structure 600. Note that metadata (not shown) stored in any PCPIed blocks (e.g., 505, 410, and 420C) protects these blocks from being recycled or overwritten until they are released from all PCPIs. Thus, while the active file system inode for the inode file 605 points to new blocks 420A, 420B and 420C', the old blocks 410, 417, 419 and 420C are retained until the PCPI is fully released.

After a PCPI has been created and file data blocks modified, the file system 280 can reconstruct or "restore" the file system inode structure as it existed at the time of the PCPI by accessing the PCPI inode. By following the pointers contained in the PCPI inode 505 through the inode file indirect block 410, inode 417 and indirect block 419 to the unmodified file data blocks 420A-C, the file system 280 can reconstruct the state of the file system as it existed at the time of creation of the PCPI.

Figure 7:
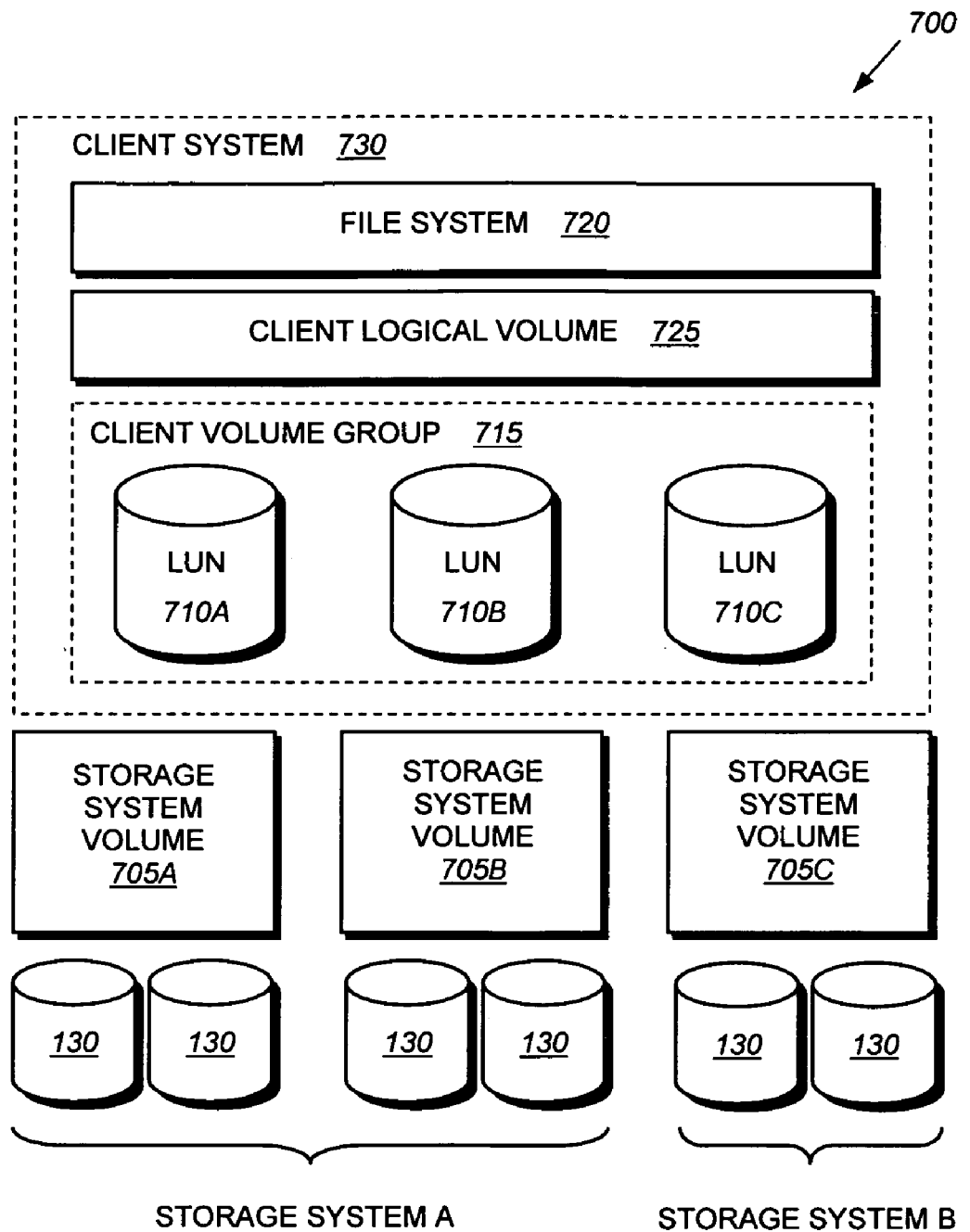
FIG. 7 is a schematic block diagram showing a file system overlaid onto a volume group comprising one or more luns in accordance with embodiment of the present invention.

FIG. 7 is a schematic block diagram of an exemplary environment 700 showing a client file system 720 overlaid onto a logical volume 725 organized from a volume group 715 in accordance with an embodiment of the present invention. At the base of the environment 700 are the disks 130 associated with one or more storage systems. Overlaid onto the disks 130 are a plurality of storage system volumes 705 A, B, C. Illustratively, each volume 705 includes a lun 710A-C, which may be exported by the storage systems. Volume group 715 is maintained and managed by volume manager 155 executing on client 150. The volume manager, in conjunction with the file systems of the client, overlays the file system 720 onto the logical volume 725 defined within the volume group 715. Alternatively, an application executing on the client may access the logical volume as a region of raw data storage. As noted above, the volume manager aggregates a number of luns into a single volume group, which provides a storage space to be utilized by the file system. The present invention is directed to enabling the creation of a PCPI of each storage system volume 705 in a crash consistent state to enable the easy recovery of the luns providing a volume group to enable the volume manager to restore the volume group and associated file systems once the PCPI.

D. Generating A Crash Consistent PCPI Set

The present invention overcomes the disadvantages of the prior art by providing a technique for generating a crash consistent persistent consistency point image (PCPI) set of a storage space managed by one or more storage systems. One or more data containers, such as logical unit numbers (luns), stored within a plurality of volumes managed by the storage systems are organized into one or more volume (or disk) groups, which are then subsequently organized into a client volume by a client volume manager. The storage space is then defined on the volume(s) by, for example, overlaying a client file system onto the client volume or enabling an application to directly manage data stored within the volume(s). Such storage spaces may be utilized in a Linux or other computer farm space to provide sufficient storage for enterprise level applications.

A client side agent is provided that executes on each client configured to generate a crash consistent PCPI set of the storage space. When an administrator initiates a PCPI create operation on the storage space, the agent first accesses each storage system and obtains information regarding the data containers residing on the storage space. This information may include, e.g., a name of each storage system, a name of each data container, etc. Once the appropriate file information has been obtained, the agent retrieves a first set of read/write (R/W) statistics for each data container that is part of the storage space. The agent then causes each storage system to generate a PCPI of each volume storing a data container, as described further below. Once the PCPI has been generated, the agent retrieves a second set of R/W statistics. The agent compares the first set of R/W statistics with the second set of R/W statistics. If the two sets of R/W statistics are equivalent then no modifying operations were performed to the data container while the PCPIs were being generated. As such, the PCPI set is considered crash consistent.

However, if the comparison results on the two sets of statistics not matching (not equal), the PCPI set is considered crash inconsistent. In response, the agent deletes the newly generated PCPIs and essentially restarts the PCPI create operation by, inter alia, retrieving a new first set of R/W statistics, generating a PCPI of each volume retrieving a second set of R/W statistics, etc. Notably, the agent may attempt to obtain a crash consistent PCPI set for only a predetermined number of times. If the agent is unable to generate such a PCPI set within the predetermined time, an error message is generated and displayed to alert the administrator that appropriate action is required, e.g., the number of I/O operations directed to the storage space is reduced to thereby enable generation a crash consistent PCPI set.

Figure 8:
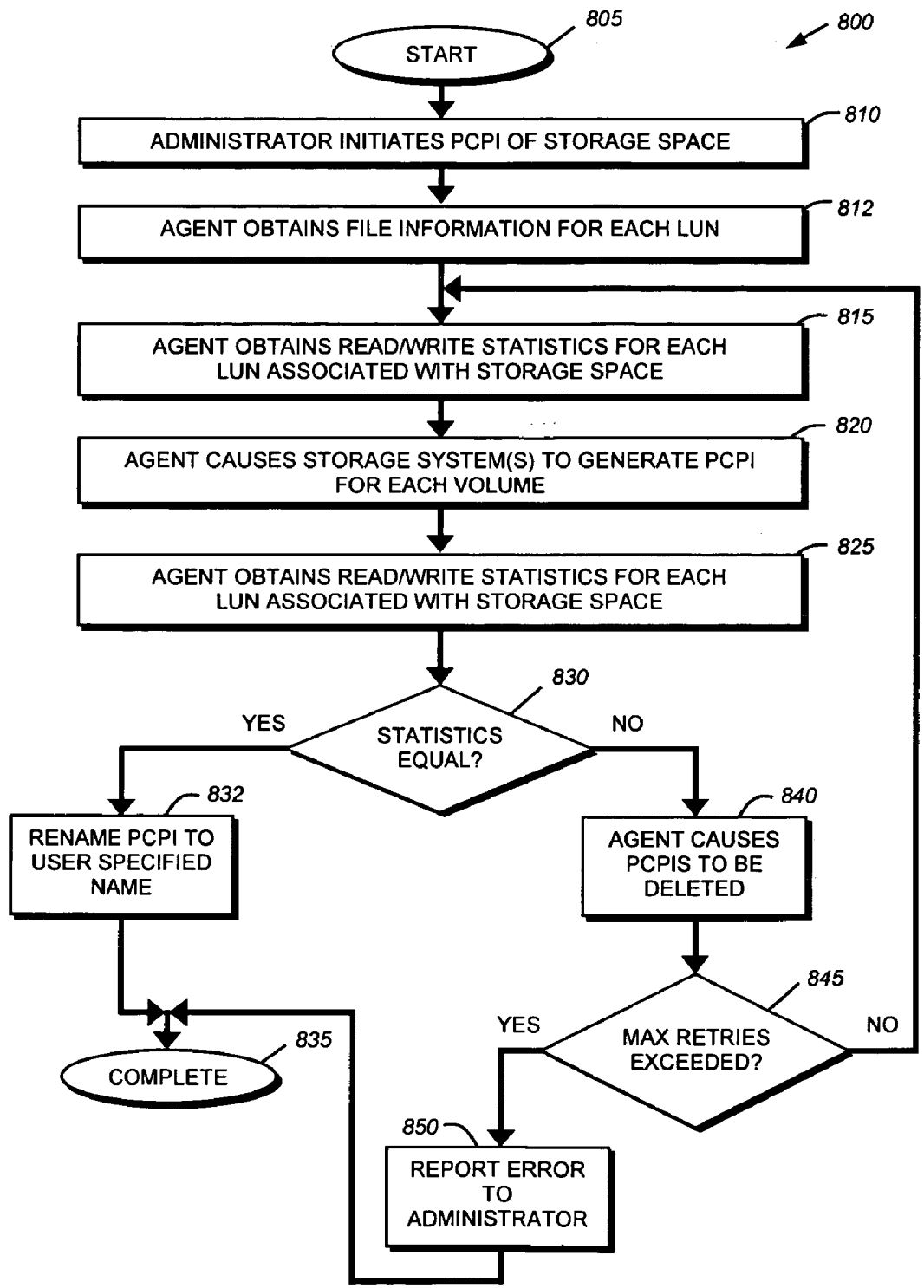
FIG. 8 is a flowchart detailing the steps of a procedure for generating a crash consistent set of persistent consistency point image set in accordance with an embodiment of the present invention.

FIG. 8 is a flowchart detailing the steps of a procedure 800 for generating a crash consistent PCPI set in accordance with an embodiment of the present invention. The procedure 800 begins in step 805 and continues to step 810 where an administrator initiates the creation of a PCPI of the storage space. This may be performed by, for example, the administrator executing a command on the client or the occurrence of a predefined event. For example, an administrator may configure the client to generate a PCPI of the storage space at a set time interval. In step 812, the agent obtains file and volume information for each lun by, for example, obtaining the identity of the storage system serving the lun and the volume in which the lun is stored. Illustratively, this information may be obtained using in-band operations such as those described in U.S. Pat. No. 7,069,307 entitled, SYSTEM AND METHOD OF INBAND MANAGEMENT OF A VIRTUAL DISK, by Herman Lee, et al., issued Jun. 27, 2006. Such file and/or volume information may be necessary to effectuate RPCs later in procedure 800. Once the agent has obtained the appropriate file information, the client side agent then obtains a set of read/write (R/W) statistics for each lun associated with the storage space in step 815. Illustratively, these R/W statistics are obtained via a RPC to each storage system exporting one or more luns. The R/W statistics may include, e.g., the number of read/write operations performed to a particular lun up to that point in time.

Once the R/W statistics have been retrieved, the agent causes each storage system to generate a PCPI for each volume containing a lun that provides part of the storage space. This may be accomplished by, for example, the agent sending a RPC to the storage operating system executing on the storage system to generate an appropriate PCPI. The PCPI is normally generated with a temporary name, i.e., a name that is not what the user specified. This use of a temporary name ensures that should a system crash occur, a potentially crash inconsistent PCPI does not have the user specified name. Once the PCPI set has been generated, the agent, in step 825, obtains a second set of R/W statistics for each lun associated with the storage space. In step 830, the agent determines whether the first and second set of R/W statistics are equal. If they are equal, then PCPI set is crash consistent and the procedure branches to step 832 where the PCPI is renamed to the appropriate user-specific name. The procedure then completes in step 835. However, if they are not equal, then the PCPI set is crash inconsistent and the procedure branches to step 840 where the agent causes the persistent consistency point images to be deleted. The agent then determines, in step 845 whether a maximum number of attempts to generate a crash consistent PCPI set has been exceeded. If not, the procedure returns to step 815. However, if the maximum number of attempts has been exceeded, the agent branches to step 850 and reports an error to the administrator before the procedure completes in step 835.

The foregoing description has been directed to specific embodiments of this invention. It will be apparent, however, that other variations and modifications may be made to the described embodiments, with the attainment of some or all of their advantages. For instance, it is expressly contemplated that the teachings of this invention can be implemented as software, including a computer-readable medium having program instructions executing on a computer, hardware, firmware, or a combination thereof. Additionally, while the present invention is written in terms of data containers, it is expressly contemplated that the term data container can encompass logical unit numbers (luns, volumes or other defines storage entities. Accordingly this description is to be taken only by way of example and not to otherwise limit the scope of the invention. Therefore, it is the object of the appended claims to cover all such variations and modifications as come within the true spirit and scope of the invention.

What is claimed is:

1. A computer method for generating persistent consistency point images (PCPIs), comprising:
    obtaining a first set of write statistics for a plurality of data containers associated with a first storage space;
    generating the PCPIs for each of the plurality of data containers associated with the first storage space from which the first set of write statistics were obtained;
    obtaining a second set of write statistics for the plurality of data containers associated with the first storage space from which the first set of write statistics were obtained;
    determining the modifying operations were performed to at least one data container of the plurality of data containers while generating the PCPIs for each of the plurality of data containers, if the first and the second set of write statistics of the first storage space are not equal;
    deleting each of the generated PCPIs in response to determining that modifying operations were performed to the at least one data container of the plurality of data containers, while generating the PCPIs for each of the plurality of data containers;
    determining that no modifying operations were performed to the at least one data container of the plurality of data containers while generating the PCPIs for each of the plurality of data containers, if the first and the second set of write statistics of the first storage space are equal; and
    storing the generated PCPIs for each of the plurality of data containers on a storage device in response to determining that no modifying operations were performed to the at least one data containers of the plurality of data containers, while generating the PCPIs for each of the plurality of data containers, whereby each PCPI for each of the plurality of data containers comprises modifying operations up to a time of the first set of statistics.

2. The method of claim 1 further comprising:
labeling the first storage space as logical unit numbers.

3. The method of claim 1 further comprising:
organizing one or more logical unit numbers into a volume.

4. The method of claim 1 further comprising:
collecting statistics of a number of read operations directed to the first storage space.

5. The method of claim 1 further comprising:
sending a remote procedure call to one or more storage systems hosting one or more storage spaces.

6. The method of claim 1 further comprising:
obtaining information regarding one or more storage spaces.

7. The method of claim 1 further comprising:
using a plurality of storage systems to host one or more storage spaces; and
sending a remote procedure call to one or more storage systems hosting the one or more storage spaces.

8. A computer system, comprising:
a volume manager configured to organize, a plurality of, data containers into a first storage space, an agent, executed by a processor of a computer system, configured to obtain a first set of write statistics for the plurality of data containers associated with the first storage space, the agent further configured to cause one or more storage systems to generate persistent consistency point images of each of the plurality of data containers associated with the first storage space and further configured to obtain a second set of write statistics for the plurality of data containers associated with the first storage space;
the agent further configured to determine that no modifying operations were performed to at least one data container of the plurality of data containers while generating the persistent consistency point images for each of the plurality of data containers if, the first and the second set of write statistics for the first storage space are equal, the agent further configured to store the persistent consistency point images for each of the plurality of data containers on a storage device in response to determining that no modifying operations were performed to the at least one data container while generating the persistent consistency point images for each of the plurality of data containers, whereby each persistent consistency point image for each of the plurality of data containers comprises modifying operations up to a time of the first set of statistics; and the agent further configured to determine that modifying operations were performed to the at least one data container of the plurality of data containers while generating the persistent consistency point images for each of the plurality of data containers if the first and the second set of write statistics are not equal and the agent further configured to delete each of the generated persistent consistency point images in response to determining that modifying operations were performed to the at least one data container of the plurality of data containers while generating the persistent consistency point images for each of the plurality of data containers.

9. The system of claim 8 further comprising:

logical unit numbers configured to identify one or more storage spaces.

10. The system of claim 8 further comprising:

a number of read operations statistics directed to one or more storage spaces configured to be collected.

11. The system of claim 8 further comprising:

the agent further configured to send a remote procedure call to one or more storage systems hosting one or more storage spaces.

12. The system of claim 8 further comprising:

the agent further configured to obtain information regarding each of the one or more storage systems associated with the first storage space.

13. The system of claim 1, further comprising:

the agent further configured to obtain information regarding each of the one or more storage systems by sending a remote procedure call to at least one storage system of the one or more storage systems.

14. A computer system for generating persistent consistency point images (PCPIs), comprising:

means for obtaining, by a processor executed by a computer system, a first set of write statistics for a plurality of data containers associated with a first storage space;

means for generating the PCPIs for each of the plurality of data containers associated with the first storage space from which the first set of write statistics were obtained;

means for obtaining a second set of write statistics for the plurality of data containers associated with the first storage space from which the first set of write statistics were obtained;

means for determining that modifying operations were performed to at least one data containers of the plurality of data containers while generating the PCPIs for each of the plurality of data containers if the first and the second set of write statistics of the first storage space are note equal;

means for deleting each of the generated PCPIs in response to determining the modifying operations were performed to the at least one data container of the plurality of data containers while generating the PCPIs for each of the plurality of data containers;

means for determining that no modifying operations were performed to the at least one data container of the plurality of data containers while generating the PCPIs for each of the plurality of data containers, if the first and the second set of write statistics of the first storage space are equal; and means for storing the generated PCPIs for each of the plurality of data containers on a storage device in response to determining that no modifying operations were performed to the at least one data container of the plurality of data containers, while generating the PCPIs for each of the plurality of data containers, whereby each PCPI for each of the plurality of data containers comprises modifying operations up to a time of the first set of statistic.

15. The system of claim 14 further comprising:

means for labeling the first storage space as logical unit numbers.

16. The system of claim 14 further comprising:

means for collecting statistics of a number of read operations directed to the first storage space and means for collecting statistics of a number of write operations directed to the first storage space.

17. The system of claim 14 further comprising:

means for obtaining information regarding one or more storage spaces.

18. A computer readable medium container executable program instructions executed by a processor, comprising:

program instructions that obtain a first set of write statistics for a plurality of data containers associated with a first storage space;

program instructions that generate persistent consistency point images (PCPIs) for each of the plurality of data containers associated with the first storage space from which the first set of write statistics were obtained;

program instructions that obtain a second set of write statistics for the plurality of data containers associated with the first storage space from which the first set of write statistics were obtained;

program instructions that determine that modifying operations were performed to at least one data container of the plurality of data containers while generating the PCPIs for each of the plurality of data containers, if the first and the second set of write statistics of the first storage space are not equal;

program instructions that delete each of the generated PCPIs in response to determining that modifying operations were performed to the at least one data container of the plurality of data containers while generating the PCPIs for each of the plurality of data containers;

program instructions that determine that no modifying operations were performed to the at least one data container of the plurality of data containers while generating the PCPIs for each of the plurality of data containers, if the first and the second set of write statistics of the first storage space are equal; and program instructions that store the generated PCPIs for each of the plurality of data containers on a storage device in response to determining that no modifying operations were performed to the at least one data container of the plurality of data containers, while generating the PCPIs for each of the plurality of data containers, whereby each PCPI for each of the plurality of data containers comprises modifying operations up to a time of the first set of statistics.

19. The method of claim 1 further comprising:

using a name of at least one data container as a statistic.

20. The method of claim 1 further comprising:

using a name of a storage system as a statistic.

21. The method of claim 1 further comprising:

using a number of I/O, operations performed as a statistic.

22. The method of claim 1 further comprising:

setting a predetermined amount of attempts to generate a crash consistent PCPI.

23. The method of claim 22 further comprising:
displaying, in response to failing to generate the crash consistency PCPI within the predetermined amount of attempts, an error message.

24. The method of claim 1 further comprising:
generating the PCPIs with a temporary name; and
renaming the PCPIs, in response to the first and the second set of write statistics being equal, to an appropriate user-specific name.

25. The method of claim 1 further comprising:
receiving I/O commands to a subset storage space while the PCPIs are being generated.

26. The method of claim 1 further comprising:
generating the PCPIs of only one storage system of a plurality of storage systems.

27. The method of claim 1 further comprising:
generating the PCPIs of multiple storage systems of a plurality of storage systems.

28. The computer system of claim 8 further comprising:
a subset storage space configured to receive I/O commands while the persistent consistency point images are being generated.

29. The computer system of claim 8 further comprising:
the storage system configured to generate the persistent consistency point images of only one storage system of a plurality of storage systems.

30. The method of claim 8 further comprising:
the storage system configured to generate the persistent consistency point images of multiple storage systems of a plurality of storage systems.

31. The computer system of claim 14 further comprising:
means for receiving I/O commands to a subset storage space while the PCPIs are being generated.

32. The computer system of claim 14 further comprising:
means for generating the PCPIs of only one storage system of a plurality of storage systems.

33. The computer system of claim 14 further comprising:
means for generating the PCPIs of multiple storage systems of a plurality of storage systems.

34. A computer method for generating persistent consistency point images of a storage system, comprising:
obtaining a first set of statistics for a plurality of data containers associated with a subset of a first storage space;
generating the persistent consistency point images for each of the plurality of data containers associated with the subset space of the first storage space;
receiving I/O commands to the first storage space while the persistent consistency point images are being generated;
obtaining a second set of statistics for the plurality of data containers associated with the subset space of the first storage space;
determining that modifying operations were performed to at least one data container of the plurality of data containers associated with the subset of the first storage space while generating the persistent consistency point images for each of the plurality of data containers associated with the subset of the first storage space if the first and the second set of statistics for the plurality of data containers associated with the subset of the first storage space are not equal;
determining that no modifying operations were performed to the at least one data container of the plurality of data containers associated with the subset of the first storage space while generating the persistent consistency point images for each of the plurality of data containers associated with the subset of the first storage space if the first and the second set of statistics for the plurality of data containers associated with the subset of the first storage space are equal; and
writing the persistent consistency point images to a storage device in response to determining that no modifying operations were performed to the at least one data container of the plurality of data containers associated with the subset of the first storage space while generating the persistent consistency point images for each of the plurality of data containers associated with the subset of the first storage space, whereby each persistent consistency point image for each of the plurality of data containers associated with the subset of the first storage space comprises modifying operations up to a time of the first set of statistics.

35. The method of claim 34 further comprising:
generating the persistent consistency point images of only one storage system of a plurality of storage systems.

36. The method of claim 34 further comprising:
generating the persistent consistency point images of multiple storage systems of a plurality of storage systems.

37. A computer readable medium containing executable program instructions executed by a processor, comprising:
program instructions that obtain a first set of statistics for a plurality of data containers associated with a subset of a first storage space;
program instructions that generate persistent consistency point images for each of the plurality of data containers associated with the subset space of the first storage space;
program instructions that receive I/O commands to the first storage space while the persistent consistency point images are being generated;
program instructions that obtain a second set of statistics for the plurality of data containers associated with the subset space of the first storage space;
program instructions that determine that modifying operations were performed to at least one data container of the plurality of data containers associated with the subset of the first storage space while generating the persistent consistency point images for each of the plurality of data containers associated with the subset of the first storage space if the first and the second set of statistics for the plurality of data containers associated with the subset of the first storage space are not equal;
program instructions that determine that no modifying operations were performed operations performed to the at least one data container of the plurality of data containers associated with the subset of the first storage space while generating the persistent consistency point images for each of the plurality of data containers associated with the subset of the first storage space if the first and the second set of statistics for the plurality of data containers associated with the subset of the first storage are equal, and
program instructions that write the persistent consistency point images to a storage device in response to determining that no modifying operations were performed to the at least one data container of the plurality of data containers associated with the subset of the first storage space while generating the persistent consistency point images for each of the plurality of data containers associated with the subset of the first storage space, whereby each persistent consistency point image for each of the plurality of data containers associated with the subset of the first storage space comprises modifying operations up to a time of the first set of statistics.

38. A computer system for generating a persistent consistency point image, comprising:
- an agent configured to obtain, by a processor executed by a computer system, a first set of statistics for a plurality of data containers associated with a subset of a first storage space;
- a storage system configured to generate persistent consistency point images for each of the plurality of data containers associated with the subset space of the first storage space;
- the storage system further configured to receive I/O commands to the first storage space while the persistent consistency point images are being generated;
- the agent further configured to obtain a second set of statistics for the plurality of data containers associated with the subset space of the first storage space;
- the agent further configured to determine that modifying operations were performed to at least one data container of the plurality of data containers associated with the subset of the first storage space while generating the persistent consistency point images for each of the plurality of data containers associated with the subset of the first storage space if the first and the second set of statistics for the plurality of data containers associated with the subset of the first storage space are not equal; and
- the agent further configured to determine that no modifying operations were performed to the at least one data container of the plurality of data containers associated with the subset of the first storage space while generating the persistent consistency point images for each of the plurality of data containers associated with the subset of the first storage space if the first and the second set of statistics for the plurality of data containers associated with the subset of the first storage space are equal the agent further configured to write the persistent consistency point images to a storage device in response to determining that no modifying operations were performed to the at least one data container of the plurality of data containers associated with the subset of the first storage space while generating the persistent consistency point images for each of the plurality of data containers associated with the subset of the first storage space, whereby each persistent consistency point image for each of the plurality of data containers associated with the subset of the first storage space comprises modifying operations up to a time of the first set of statistics.

* * * * *

UNITED STATES PATENT AND TRADEMARK OFFICE
CERTIFICATE OF CORRECTION

PATENT NO. : 7,650,366 B1  Page 1 of 2
APPLICATION NO. : 11/223844
DATED : January 19, 2010
INVENTOR(S) : Vitaly Revsin It is certified that error appears in the above-identified patent and that said Letters Patent is hereby corrected as shown below:

Col. 6, Line 37, please amend as shown:
   the disks over an ~~I/0~~ I/O interconnect arrangement, such as a Col. 14, Line 1, please amend as shown:
   determining ~~the~~ that modifying operations were performed to Col. 14, Line 4, please amend as shown:
   rality of data containers~~,~~ if the first and the second set of Col. 14, Line 19, please amend as shown:
   at least one data ~~containers~~ of the plurality of data con- Col. 15, Line 48, claim 14, please amend as shown:
   performed to at least one data ~~containers~~ of the plurality Col. 15, Line 51, claim 14, please amend as shown:
   set of write statistics of the first storage space are ~~note~~ not Col. 15, Line 54, claim 14, please amend as shown:
   to determining ~~the~~ that modifying operations were per- Col. 15, Line 61, claim 14, please amend as shown:
   each of the plurality of data containers~~,~~ if the first and the Col. 16, Line 17, claim 18, please amend as shown:
   18. A computer readable medium ~~container~~ containing executable Col. 16, Line 64, claim 21, please amend as shown:
   using a number of I/O~~,~~ operations performed as a statistic.

Col. 18, Line 47, claim 37, please amend as shown:
   operations were performed ~~operations performed~~ to the Col. 18, Line 54, claim 37, please amend as shown:

containers associated with the subset of the first storage <u>space</u>

Signed and Sealed this

Thirtieth Day of March, 2010

David J. Kappos
*Director of the United States Patent and Trademark Office*

UNITED STATES PATENT AND TRADEMARK OFFICE
CERTIFICATE OF CORRECTION

PATENT NO.        : 7,650,366 B1                                      Page 1 of 1
APPLICATION NO.   : 11/223844
DATED             : January 19, 2010
INVENTOR(S)       : Vitaly Revsin It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 466 days.

Signed and Sealed this

Twenty-third Day of November, 2010

David J. Kappos
*Director of the United States Patent and Trademark Office*